(12) United States Patent
Ferguson et al.

(10) Patent No.: US 11,171,416 B2
(45) Date of Patent: Nov. 9, 2021

(54) MULTI-ELEMENT ANTENNA ARRAY WITH INTEGRAL COMPARISON CIRCUIT FOR PHASE AND AMPLITUDE CALIBRATION

(71) Applicant: Honeywell International Inc., Morris Plains, NJ (US)

(72) Inventors: Paul Ferguson, Redmond, WA (US); Ruy C. Brandao, Redmond, WA (US); Thomas W. Hastings, Woodinville, WA (US); Eduard Shestak, Redmond, WA (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 16/568,708

(22) Filed: Sep. 12, 2019

(65) Prior Publication Data

US 2021/0036420 A1 Feb. 4, 2021

Related U.S. Application Data

(60) Provisional application No. 62/881,132, filed on Jul. 31, 2019.

(51) Int. Cl.
*H01Q 3/26* (2006.01)
*H04B 17/12* (2015.01)
(Continued)

(52) U.S. Cl.
CPC ............... *H01Q 3/267* (2013.01); *G01S 7/40* (2013.01); *H04B 17/12* (2015.01); *H04B 17/21* (2015.01)

(58) Field of Classification Search
CPC ........ H01Q 3/267; H04B 17/21; H04B 17/12; H04B 17/29; H04B 17/19; G01S 7/40
(Continued)

(56) References Cited

U.S. PATENT DOCUMENTS 6,104,935 A * 8/2000 Smith .................... H01Q 1/246
455/562.1
6,157,343 A 12/2000 Andersson et al.
(Continued)

FOREIGN PATENT DOCUMENTS

| EP | 1649614 B1 | 11/2010 |
|---|---|---|
| EP | 2413427 A2 | 2/2012 |
| WO | 2017/071583 A1 | 5/2017 |

OTHER PUBLICATIONS

"Branchline Couplers," Microwaves101, Jun. 12, 2019, accessed from https://www.microwaves101.com/encylopedias/branchline-couplers, 10 pp.
(Continued)

*Primary Examiner* — Eugene Yun
(74) *Attorney, Agent, or Firm* — Shumaker & Sieffert, P.A.

(57) ABSTRACT

Described herein is a calibration circuit for a multiple element antenna with two or more antenna transmit and receive elements. In some examples the multi-element antenna may also include a beamforming network that combine the multiple antenna radiating element inputs and outputs with controlled phase and amplitude relationships such that spatial beams can be formed by varying the phase and amplitudes of two or more signals applied to antenna input ports for the antenna. The calibration circuit of this disclosure may be used to obtain data to determine phase and amplitude offsets induced by the combined transmission elements, and any phase and amplitude offsets induced by the transmitter or receiver circuitry. The determined phase and amplitude offsets may then be removed from received signal measurements and compensated for in transmit signal generation.

20 Claims, 5 Drawing Sheets

(51) Int. Cl.
*H04B 17/21* (2015.01)
*G01S 7/40* (2006.01)

(58) Field of Classification Search
USPC ...................................................... 455/67.14
See application file for complete search history.

(56) References Cited

U.S. PATENT DOCUMENTS

| | | | |
|---|---|---|---|
| 6,208,287 | B1 | 3/2001 | Sikina et al. |
| 6,339,399 | B1 | 1/2002 | Andersson et al. |
| 8,897,717 | B2 | 11/2014 | Ferguson et al. |
| 9,866,259 | B1* | 1/2018 | Margomenos ............ H04B 1/40 |
| 2006/0190575 | A1 | 8/2006 | Harvey et al. |
| 2009/0027258 | A1 | 1/2009 | Stayton |
| 2010/0259325 | A1* | 10/2010 | Saunders .................. H01Q 3/36 |
| | | | 330/124 R |
| 2011/0267216 | A1* | 11/2011 | Smith .................... G01S 13/781 |
| | | | 342/30 |
| 2012/0028587 | A1 | 2/2012 | Ferguson et al. |
| 2013/0260844 | A1 | 10/2013 | Rucki et al. |
| 2014/0111373 | A1* | 4/2014 | Puzella ............... G01S 13/4463 |
| | | | 342/174 |
| 2015/0126135 | A1* | 5/2015 | Katipally ............... H04B 17/11 |
| | | | 455/77 |

OTHER PUBLICATIONS

"Coupler Fundamentals," Microwaves101, May 7, 2019, accessed from https://www.microwaves101.com/encylopedias/coupler-fundamentals, 8 pp.

"Monopulse Comparator Networks," Microwaves101, May 7, 2019, accessed from https://microwaves101.com/enclypedias/monopulse-comparator-networks, 7 pp.

Galan et al., "Diversity Monopulse Antenna Based on a Dual-Frequency and Dual Mode CRLH Rat-Race Coupler," Progress in Electromagnetics Research B, vol. 14, 87-106, Applicant points out, in accordance with MPEP 609.04(a), that the year of publication, 2009, is sufficiently earlier than the effective U.S. filing date, so that the particular month of publication is not in issue, 105 pp.

"A Fresh Look at the SWR Bridge," the SWR Bridge, accessed May 7, 2019, accessed from https://www.qsl.net/g4xck/swr.htm, 3 pp.

Extended Search Report from counterpart European Application No. 20186821.3, dated Jan. 12, 2021, 9 pp.

U.S. Appl. No. 16/892,029, by Honeywell International Inc. (Inventor: Brandao), filed Jun. 3, 2020.

U.S. Appl. No. 16/949,690, by Honeywell International Inc. (Inventors: Brandao et al.), filed Nov. 11, 2020.

U.S. Department of Transportation, "Introduction to TCAS II," Version 7.1, HQ-111358, Feb. 28, 2011, 50 pp.

Response to Extended Search Report dated Jan. 12, 2021, from counterpart European Application No. 20186821.3, filed May 28, 2021, 26 pp.

* cited by examiner

MULTI-ELEMENT ANTENNA ARRAY WITH INTEGRAL COMPARISON CIRCUIT FOR PHASE AND AMPLITUDE CALIBRATION

This application claims the benefit of U.S. Provisional Patent Application 62/881,132, filed Jul. 31, 2019, the entire content of which is incorporated herein by reference.

TECHNICAL FIELD

The disclosure relates to a calibration method for directional antenna systems.

BACKGROUND

Some examples of antennae include two or more antenna elements arranged as an array. By comparing differences in a received signal at the antenna elements, signal processing circuitry coupled to an antenna may be able to determine an angle of arrival (AoA) of the received signal. Similarly, by applying differences to a signal transmitted from each antenna element of an antenna, such as a phase difference, the antenna may focus more transmitted energy in a selected direction.

SUMMARY

In general, the disclosure is directed to a calibration circuit for a multiple element antenna, such as an antenna that includes two or more antenna elements. In some examples, the multiple element, or multi-element, antenna may also include a beamforming network, such as a radio frequency (RF) circuit that combine the multiple antenna radiating element inputs and outputs with controlled phase and amplitude relationships such that spatial beams can be formed by varying the phase and amplitudes of two or more signals applied to antenna input ports for the antenna.

In some examples, the antenna system may be dual directional in that the beamformer network splits an antenna input signal with controlled phase and amplitudes and applies those beamformer outputs to the radiating elements such that spatial beams are formed for transmitting signals. Further examples of the multi-element antenna with beamformer may output signals to receiver circuitry. The phase relationship of these output signals may be used to directly determine the angle of arrival of a received signal.

The calibration circuit of this disclosure may be used to obtain data to determine phase and amplitude offsets for a dual-feed multi-element antenna. A dual-feed antenna has two transmission elements that carry signals from a signal generating circuitry to the input ports of the multi-element antenna as well as carry signals received from the multi-element antenna to receiver circuitry. Each of the two transmission elements therefore has a transmit-path functionality and a receive-path functionality. The calibration circuit of this disclosure may be used to determine the phase and amplitude offsets induced by the combined transmission elements, and any phase and amplitude offsets induced by the transmitter or receiver circuitry. The determined phase and amplitude offsets may then be removed from received signal measurements and compensated for in transmit signal generation. The calibration circuit of this disclosure may be provided as a built-in function to periodically determine any offsets to eliminate variation over time, for example due to the environmental effects of temperature, altitude, humidity, and other factors.

In one example, the disclosure is directed to a multi-element array antenna system, comprising: a plurality of antenna elements; a beamforming network coupled to the plurality of antenna elements, the beamforming network comprising a first input port and a second input port; a first transmission element and a second transmission element, the first transmission element coupled to the beamforming network at the first input port and the second transmission element coupled to the beamforming network at the second input port, wherein the first transmission element and the second transmission element have respective transmit-path functionality and receive-path functionality; a calibration circuit comprising a first sampling component electromagnetically coupled to the first transmission element and configured to sample a first transmit signal from the first transmission element; a second sampling component electromagnetically coupled to the second transmission element and configured to sample a second transmit signal from the second transmission element, wherein the calibration circuit is configured to generate an output signal based at least in part on the first transmit signal and the second transmit signal, wherein the output signal comprises information used to determine an amplitude offset and phase offset associated with the transmit-path functionality of the first transmission element and second transmission element.

In another example, the disclosure is directed to a calibration circuit, the circuit comprising: a first sampling component and a second sampling component; a combining element: coupled to the first sampling component and the second sampling component; and configured to combine a first signal from the first sampling component and a second signal from the second sampling component into a composite radio frequency (RF) signal; and a detector element coupled to the combining element and configured to convert the composite RF signal into a DC output signal, wherein: the first sampling component is configured to sample a first transmit signal to a first input element of a multiple element RF antenna; the second sampling component is configured to sample a second transmit signal to a second input element of a multiple element RF antenna; the DC output signal is based at least in part on the first transmit signal and the second transmit signal, and the DC output signal comprises information used to determine an amplitude offset and phase offset associated with a transmit-path functionality of the first input element and second input element.

In another example, the disclosure is directed to a method comprising: sampling, with a first sampling component comprising one or more directional couplers electromagnetically coupled to a first transmission element connected to a multiple element radio frequency (RF) antenna, a first transmit signal; sampling, with a second sampling component comprising one or more directional couplers electromagnetically coupled to a second transmission element connected to the same multiple element RF antenna, a second transmit signal, wherein the first transmission element and the second transmission elements each have a respective transmit-path functionality, a second transmit signal; generating an output signal based at least in part on the first transmit signal and the second transmit signal; receiving, by a transmit, receiving, and processing circuitry (TRP) and via at least one of the first transmission element or the second transmission element, the output signal, wherein the first transmission element and the second transmission element couple the TRP to the multiple element RF antenna; determining, by the TRP and based on the output signal, a first amplitude setting and a first phase setting of the first transmit signal and the second transmit signal that produce a null voltage of the output signal; and determining, based on the determined first amplitude setting and the determined first phase setting of the first transmit signal and second transmit signal, an amplitude offset and phase offset associated with the transmit-path functionality of the first and second transmission elements.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
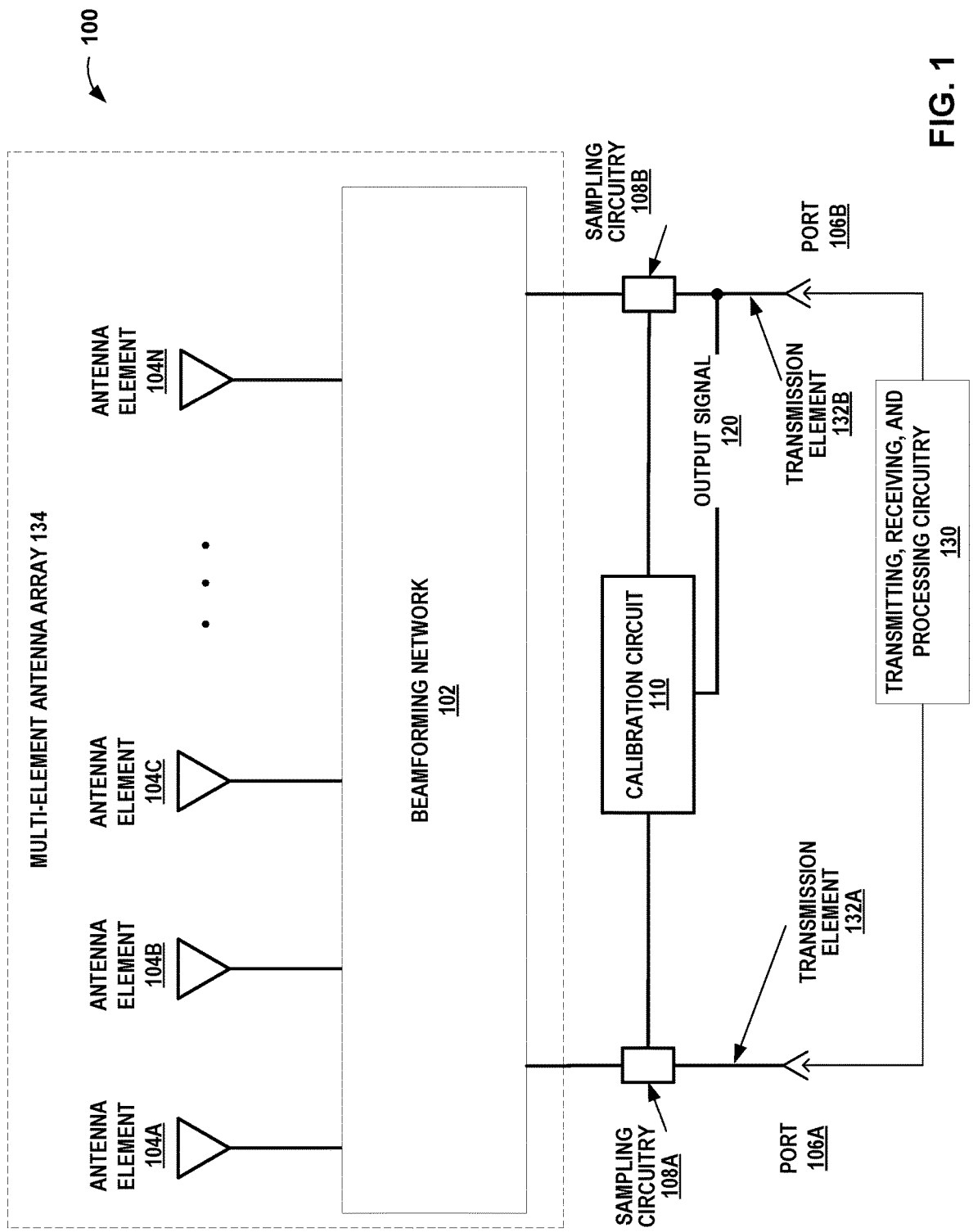
FIG. 1 is a block diagram illustrating an example multi-element antenna system with a calibration circuit according to one or more techniques of this disclosure.

The calibration techniques of this disclosure may include sampling transmit signals from each of two transmission elements coupled to the input ports of a dual-feed, multi-element antenna system. In the example of a multi-element antenna system with more than two antenna elements, the multi-element antenna system may also include a beamforming network between the input ports and the antenna elements.

During calibration, phase coherent input signals may be sent simultaneously to each of the antenna input ports via the transmission elements. Each of the phase coherent input signals is sampled by the calibration circuit and coupled into a combiner circuit. Due to the two input signals being phase-coherent and at the same frequency, the input signals combine vectorially resulting in a composite radio frequency (RF) signal. The amplitude of the composite RF signal is the vector sum of the inputs to the combiner circuit. The combiner circuit then passes the resultant composite signal to an amplitude detector circuit. The amplitude detector circuit converts the composite RF signal into a direct current (DC) output signal. The voltage of the DC output signal is proportional to the amplitude of the composite RF signal. The converted DC signal is then coupled onto one or both of the transmission elements, which may also be referred to as antenna feed lines in this disclosure. In some examples the transmission elements may be implemented with coaxial cables. The DC output signal travels back to the transmitter/receiver unit along one or both of the transmission elements.

The transmitter/receiver unit may measure the amplitude of the DC output signal. If the phase and amplitude of one or both of the phase coherent input signals is varied until the detected vector sum is minimized (i.e. nulled), then the phase coherent input signals are known to be approximately equal in amplitude and 180 degrees out of phase at the combiner input. Determining that the DC output signal is in a null condition, along with the phase and amplitude settings required to achieve the null condition therefore provide the transmit phase and amplitude calibration constants for the transmit-path functionality of the system. The transmit-path functionality is how the antenna array, the beamforming network, and transmission elements function when conducting and radiating the transmission signals.

The receive-path calibration constants may then be measured by sending a transmit signal (at the phase and amplitude settings determined during transmit-path calibration) to one of the antenna inputs and measuring the phase and amplitude of the signal received by the receive circuitry connected to the second transmission element. This measurement is then repeated for the inverse combination of antenna input and receive circuitry and processed to determine the receive calibration constants. The receive calibration constants may be applied to received signals to compensate for any offsets in the receive-path functionality of the system. The receive-path functionality is how the antenna array, the beamforming network, and transmission elements function when receiving and conducting the relatively low power receive signals (compared to the transmission signals).

FIG. 1 is a block diagram illustrating an example multi-element antenna system with a calibration circuit according to one or more techniques of this disclosure. Calibration can be accomplished as a one-time measurement in a lab, during manufacturing or at an installation site. In some examples, calibration may be a periodic process to eliminate variation over time caused by, for example, the environmental effects of temperature, altitude, humidity, etc. Periodic calibration may be provided as a built-in function of the system itself with no external support. This process is called self-calibration. Self-calibration may be helpful in applications where extreme environmental variations exist as well as applications with limited access to systems during use. Some examples may include space applications, aircraft and similar applications. In the example of aircraft, systems on board may be subject to extreme environmental variation. For example, an aircraft on the ground in a warm climate may be subject to high air temperatures and humidity and a few minutes later at altitudes above 18,000 feet, the air temperature may be sub-zero.

System 100 includes calibration circuit 110 between beamforming network 102 of multi-element antenna array 134 and transmitting, receiving and processing circuitry (TRP) 130. TRP 130 may also be referred to as TRP unit 130 in this disclosure. In the example of system 100, calibration circuit 110 is electromagnetically coupled to transmission elements 132A and 132B (also referred to collectively as transmission elements 132), by sampling circuitry 108A and 108B (referred to collectively as sampling circuitry 108).

Multi-element antenna array 134 is a multiple element antenna array that includes beamforming network 102 and at least two antenna elements 104A-104N. Antenna elements 104A, 104B, 104C and so on may be any type of antenna element configured to transmit RF energy and receive RF energy. A dipole antenna may be one example of antenna elements 104A-104N, which may be implemented as patch dipole, top-hat or other types of dipole element. Antenna elements 104A-104N may conduct RF transmit energy signals received from TRP 130 via beamforming network 102 into open space. Antenna elements 104A-104N may also conduct RF energy signals received from other transmitters to beamforming network 102. In some examples, multi-element antenna array 134 may be described as a passive phased array, in contrast to an active phased array.

In this disclosure, an antenna array may simply be referred to as an antenna. An antenna may include several antenna elements i.e. radiating elements and receiving elements. In some examples, antenna elements may only transmit or only receive, rather than both transmit and receive.

Beamforming network 102 may be a form of RF circuitry that combines the multiple antenna radiating element inputs/outputs, e.g. of antenna elements 104A-104N, with closely controlled phase and amplitude relationships. In the example of system 100, beamforming network 102 is a dual input RF circuit. In other examples, beamforming network 102 may have two or more inputs. By varying the phase and amplitudes of the or more antenna inputs to beamforming network 102, RF spatial transmit beams can be formed to focus transmitted RF energy in selected directions. Also, by determining phase differences and timing differences between RF signals received by antenna elements 104A-104N, TRP 130 may determine a direction from which an RF signal was received, i.e. the angle of arrival (AOA).

TRP 130 may also be referred to as a transmitter/receiver unit. Transmission elements 132 conduct RF energy between TRP 130 and beamforming network 102. In some examples, transmission elements from TRP 130 may connect to transmission elements 132 of multi-element antenna array 134 via connection ports. In the example of system 100, port 106A connects transmission element 132A to TRP 130 while port 106B connects transmission element 132B to TRP 130. Therefore, transmission element 132A and transmission element 132B each have respective transmit-path and receive-path functionality. The transmit-path functionality applies for the higher energy RF signals from TRP 130 to multi-element antenna array 134. The receive-path functionality applies to the relatively lower energy RF signals conducted to TRP 130 from antenna elements 104A-104N of multi-element antenna array 134.

Transmission elements 132 may be implemented by any type of conductor configured to carry RF energy of the frequency and power used by system 100. In some examples transmission elements 132 may be shielded cables, such as coaxial cables, or other types of cables, waveguides and similar components that carry RF energy. In the example of a waveguide, a separate DC conducting transmission element may be added to carry the calibration output signal to the TRP.

In the example of FIG. 1, calibration circuit 110 includes a first sampling component, shown in FIG. 1 as sampling circuitry 108A electromagnetically coupled to the first transmission element 132A. Sampling circuitry 108A is configured to sample a first transmit signal sent via transmission element 132A from TRP 130 to multi-element antenna array 134. Calibration circuit 110 also includes a second sampling component, sampling circuitry 108B, electromagnetically coupled to the second transmission element 132B and configured to sample a second transmit signal sent via transmission element 132B to multi-element antenna array 134. In some examples, sampling circuitry 108 may be components that are separate from calibration circuit 110 but connected to calibration circuit 110.

Calibration circuit 110 is configured to generate output signal 120 based at least in part on the first transmit signal and the second transmit signal. Output signal 120 includes information used to determine an amplitude offset and phase offset associated with the transmit-path functionality of the transmission element 132A and transmission element 132B. In some examples, the information used to determine an amplitude offset and phase offset is determined when the first transmit signal and the second transmit signal produce a null voltage in output signal 120. When the first transmit signal and the second transmit signal produce a null voltage in output signal 120 the first transmit signal is determined to be 180 degrees out of phase with the second transmit signal at the inputs of the calibration circuit.

The example of system 100 depicts output signal 120 coupled back onto transmission element 132B, where TRP 130 may receive output signal 120 via port 106B. However, in other examples, output signal 120 may be coupled to either or both of transmission elements 132 or to a separate transmission element (not shown in FIG. 1) specifically used for calibration signal functionality.

In some examples, TRP 130 may receive output signal 120 and perform the calibration procedure for the transmit-path functionality, i.e. send the first transmit signal via transmission element 132A and the second transmit signal via transmission element 132B, then vary the phase and/or amplitude of either the first transmit signal or the second transmit signal until output signal 120 outputs a null voltage. Based on the relationship between the amplitude and phase of the first transmit signal compared to the second transmit signal, TRP 130 may determine the phase and amplitude offsets induced by the combined transmission elements, and any phase and amplitude offsets induced by the transmitter or receiver circuitry. TRP 130 may apply these phase and amplitude offsets to accurately control the beam direction and other characteristics of the transmitted RF signal from multi-element antenna array 134. In some examples, the phase and amplitude offsets for the transmit-path functionality may be referred to as transmission calibration constants.

The results from calibration circuit 110 are used to determine the amplitude offset and phase offset associated with the receive-path functionality of system 100. That is, the results from calibration circuit 110 are used to determine the amplitude and phase settings of the TRP to generate receive path calibration input signals with known phase and amplitude associated with the receive path functionality of system 100. For example, TRP 130 may transmit a third transmit signal to multi-element antenna array 134 via transmission element 132A and monitor the phase and amplitude of the receive circuitry connected to transmission element 132B. In the example of FIG. 1, receive circuitry connected to transmission element 132B may include one or more of antenna elements 104 as well as beamforming network 102. The third transmit signal may be set by applying the transmit phase and amplitude offsets (transmission calibration constants). Said another way, calibration circuit 110 may be considered to be indirectly involved in determining receive calibration constants by establishing the transmit calibration constants that TRP 130 may use to determine and set up the relative phase of the input signals used while determining the receive function calibration constants.

Subsequently, TRP 130 may measure the signal received by receive circuitry in multi-element antenna array 134 that is connected to transmission element 132A while transmitting a fourth transmit signal to multi-element antenna array 134 via transmission element 132B and port 106B. Similar to the third transmit signal, the fourth transmit signal may apply transmission calibration constants determined from the transmit-path functionality calibration. In some examples, the fourth transmit signal may be the same as the third transmit signal. TRP 130 may measure the respective phases and amplitudes of signals received while transmitting the third transmit signal and the fourth transmit signal and thereby determine the amplitude offset and phase offset associated with the receive-path functionality of transmission elements 132 (i.e. the receive calibration constants).

In some examples, determining the receive calibration constants may be accomplished by sending the first transmit signal via transmission element 132A and measuring, using receive processing circuitry of TRP 130, the phase and amplitude of the signal received at transmission element 132B. The signal received at transmission element 132B in the example of FIG. 1, may be the first transmit signal from one or more antenna elements 104 coupled to transmission element 132A via beamforming network 102. The first transmit signal may be received by one or more other antenna elements 104 coupled to transmission element 132B via beamforming network 102.

Subsequently, the transmission and receive roles of transmission elements 132A and 132B may be reversed. That is, the second transmit signal sent via transmission element 132B may be transmitted by one or more transmission elements 104 and received by one or more other transmission elements 104 coupled to transmission element 132A via beamforming network 102. Receive processing circuitry of TRP 130 coupled to transmission element 132A may measure the phase and amplitude of the signal received by transmission element 132A. In this way TRP 130 may measure the receive path functionality of system 100 via both transmission elements 132A and 132B coupled to the input components of beamforming network 102. By applying the offsets determined during the transmission path calibration to the measured phase and amplitude characteristics for each transmission path, TRP 130 may determine the receive calibration constants for the receive path functionality of system 100. The exact phase setting of either receive calibration transmit signal may be varied, as long as the relative offset value determined during transmit calibration is known and applied to the receive calibration calculation.

Following calibration, system 100 may accurately control characteristics transmissions from multi-element antenna array 134. Similarly, system 100 may accurately determine characteristics of signals received by multi-element antenna array, such as AOA. In other words, system 100 may be configured to operate in calibration mode and in a normal system operation mode.

The techniques of this disclosure may provide advantages over other calibration techniques. For example, the calibration circuit of this disclosure may be applied to nearly any multi-element antenna array with two antenna inputs. A multi-element antenna array with two inputs may use less cabling than other multi-element antenna arrays, e.g. a four element antenna array may require 4 cables, which in the example of an aircraft, may add significant weight and complexity. The calibration circuit of this disclosure may provide self-calibration capability to many varieties of multi-element antennae.

Figure 2:
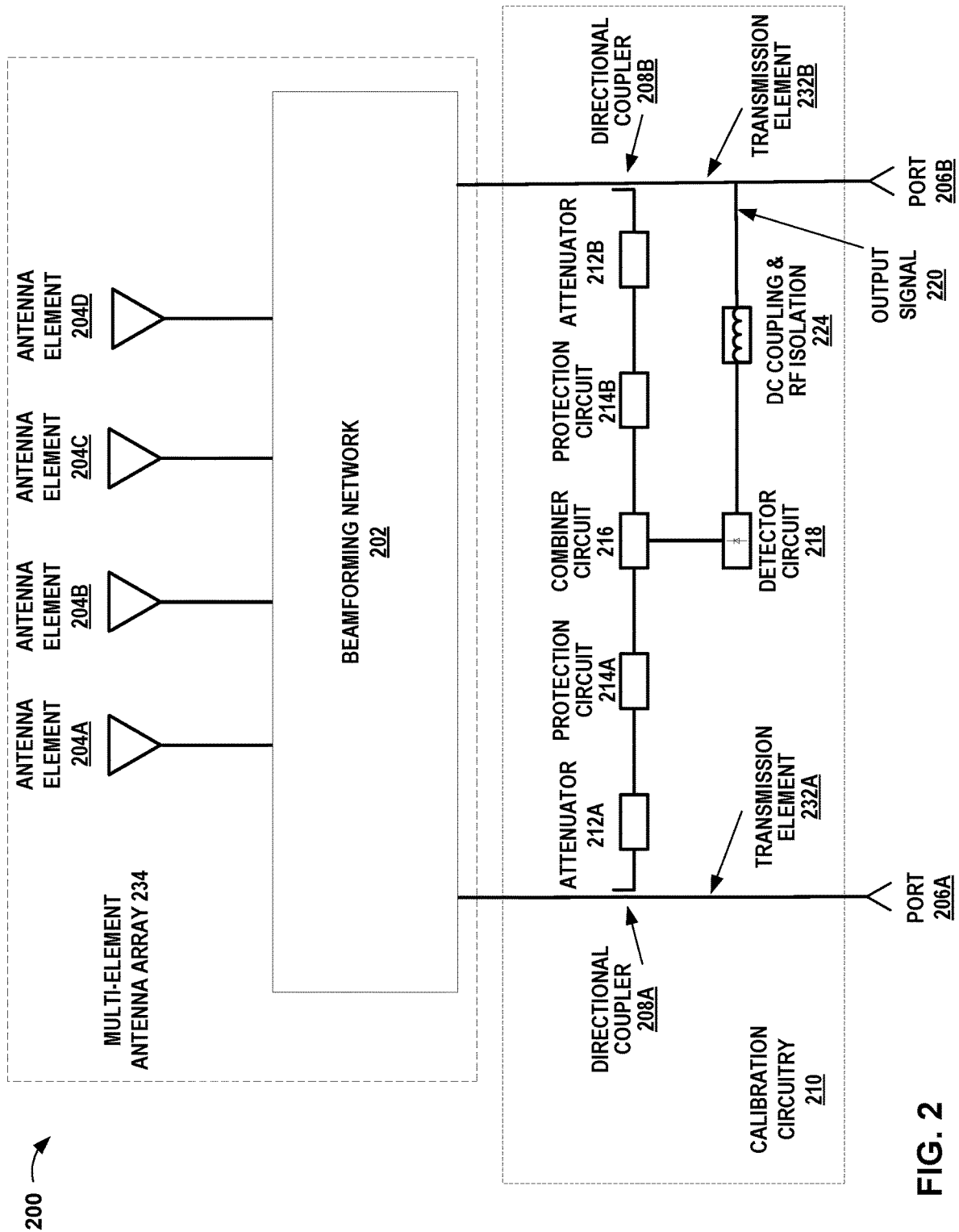
FIG. 2 is a block diagram illustrating an example four-element antenna system with a calibration circuit according to one or more techniques of this disclosure.

FIG. 2 is a block diagram illustrating an example four-element antenna system with a calibration circuit according to one or more techniques of this disclosure. System 200 is an example of system 100 described above in relation to FIG. 1.

The example of system 200 includes multi-element antenna array 234 with dual input ports 206A and 206B to conduct RF signals via transmission elements 232A and 232B. Calibration circuitry 210 is configured to sample RF signals from transmission elements 232 and couple output signal 220 to transmission element 232B.

Multi-element antenna array 234 is an example of a multiple element antenna array like multi-element antenna array 134 described above in relation to FIG. 1. Multi-element antenna array 234 includes beamforming network 202 and four antenna elements 204A-204D. Antenna elements 204A, 204B, 204C and 204D may be any type of antenna element configured to transmit RF energy and receive RF energy. An example of a four-element antenna array may include an antenna used for the traffic collision avoidance system (TCAS). As with antenna elements 104A-104N described above in relation to FIG. 1, antenna elements 204A-204D may conduct RF transmit energy signals received from a TRP or other signal source via beamforming network 202. Antenna elements 204A-204D may also conduct RF energy signals received from other transmitters to beamforming network 202.

In the example of system 200, calibration circuitry 210 includes directional couplers 208A and 208B, attenuators 212A and 212B, protection circuits 214A and 214B, combiner circuit 216, detector circuit 218, and DC coupling and RF isolation circuit 224. Directional coupler 208A is electromagnetically coupled to transmission element 232A and outputs signals sampled from transmission element 232A to attenuator 212A. Attenuator 212A outputs signals to protection circuitry 214A, which is connected to one of the inputs for combiner circuit 216. Similarly, directional coupler 208B is electromagnetically coupled to transmission element 232B and outputs signals sampled from transmission element 232B to attenuator 212B. Attenuator 212B outputs signals to protection circuitry 214B, which is connected to a second input for combiner circuit 216. Combiner circuit 216 outputs the combined signals from transmission elements 232 to detector circuit 218. DC coupling and RF isolation circuit 224 receives the signal from detector circuit 218 and couples output signal 220 to transmission element 232B. As described above for output signal 120, output signal 220 may be connected to either or both of transmission elements 232 (not shown in FIG. 2). In some examples, detector circuit 218 may output signals to a second DC coupling an RF isolation circuit (not shown in FIG. 2) to be coupled transmission element 232A.

In some examples, calibration circuit 210 may be positioned in a housing along with multi-element antenna array 234. In some examples, such as in the example of TCAS, the housing may be mounted to the exterior surface of an aircraft (not shown in FIG. 2). In some examples, a TRP, similar to TRP 130 described above in relation to FIG. 1 may connect to ports 206 and send and receive RF signals to and from multi-element antenna array 202 and calibration circuitry 210. TRP 130, the housing including multi-element antenna array 234 and other components depicted by FIGS. 1-4 may be configures as line replaceable units (LRU).

Directional couplers 208A and 208B are examples of sampling components, similar to sampling components 108 described above in relation to FIG. 1. Sampling may be described as coupling at a low coupling ratio. A directional coupler may receive an input signal and provide portions of the input signal to two different outputs. Directional couplers 208 may be implemented in various media, such as printed microstrip or stripline, as well as in coaxial and waveguide transmission lines, that are electromagnetically coupled to the transmission elements 232. Alternatively, power splitters (not shown in FIG. 2) positioned along transmission elements 232 may be used instead of directional couplers 208.

Attenuators 212A and 212B are examples of circuits that may reduce the amplitude of the transmit signals conducted by transmission elements 232 to a level compatible with combiner circuit 216 and other components of calibration circuitry 210. Examples of transmit signals may include the first transmit signal and the second transmit signal used in calibration mode and described above in relation to FIG. 1. Attenuators 212 may also be described as an attenuator element or an attenuator component of calibration circuitry 210.

In some examples, calibration circuitry 210 may include one or more protection circuits, such as protection circuit 214A and 214B. Protection circuits 214A and 214B may automatically shunt or attenuate high power signals that may damage other components of calibration circuitry 210. For example, protection circuits 214A and 214B, along with attenuators 212A and 212B may be configured to protect one or more elements of calibration circuit 210 from damage caused by high signal levels during normal system operation mode. Protection circuits 214 may also be described as protection elements of calibration circuit 210.

Combiner circuit 216 is configured to combine the sampled signals from transmission elements 232 into a composite RF signal. The composite signal is then passed to detector circuit 218. Combiner circuit 216 may be implemented as a Wilkinson combiner or other isolated vector combiner in any convenient transmission media. Combiner circuit 216 may also be referred to as a combiner element.

Detector circuit 218 may include signal-conversion functionality. Detector circuit 218 is configured to convert the composite signal from combiner circuit 216 into a DC output signal and pass this output signal to DC coupling and RF isolation circuit 224. Detector circuit 218 may also be referred to as a detector element or a converter element.

In operation, calibration circuitry 210 functions as describe above for calibration circuit 110 depicted in FIG. 1. In calibration mode, system 200 may determine the transmission calibration constants for the transmit-path functionality and the receive calibration constants for the receive-path functionality of multi-element antenna array 234 in connection with the transmitter/receiver unit connected to the antenna, e.g. a TRP.

To determine the transmission calibration constants, system 200 may perform the calibration procedure for the transmit-path functionality, i.e. receive the first transmit signal via transmission element 232A and the second transmit signal via transmission element 232B. If the phase and amplitude of one or both of the input signals is varied until the detected vector sum from detector circuit 218 is minimized (nulled), then the transmit signals are known to be equal in amplitude and 180 degrees out of phase at the output of combiner circuit 216. The phase and amplitude settings required to achieve the null condition in output signal 220 provide the transmit phase and amplitude calibration constants for the system. During normal operation mode, the transmission/receiver unit may apply the transmission calibration constants to accurately control the beam width, beam direction and other characteristics of the transmitted RF signal from multi-element antenna array 234.

Once the transmission calibration constants are known, system 200 may determine the receive calibration constants. The receive calibration constants for the receive-path functionally may be measured in two steps. First, system 200 may receive a transmit signal (at the phase and amplitude settings determined during transmit-path calibration) at transmission element 232A. Processing circuitry (not shown in FIG. 2), e.g. circuitry included in TRP 130 described above in relation to FIG. 1, may then measure the phase and amplitude of the signal received by receive processing circuitry within TRP 130 connected to transmission element 232B.

This measurement is then repeated for the inverse combination of elements. That is, system 200 may receive another transmit signal (at the phase and amplitude settings determined during transmit-path calibration) at TRP receive processing circuitry connected to transmission element 232B. The TRP receive processing circuitry may measure the respective phases and amplitudes of signals received while transmitting the third transmit signal and the fourth transmit signal. The TRP may then apply the transmit calibration constants to the measured phase and amplitude, and thereby determine the calibration constants associated with the receive-path functionality of transmission elements 232 (i.e. amplitude offset and phase offset).

Said another way, the receive processing circuitry in the TRP measures the phase and amplitude of the signal transmitted by the other transmitter that is then passed through the cables, antenna elements, beamformer, and TRP receiver circuitry. Then vice versa. The transmit calibration constants are then used to remove transmit path offsets which leaves only the receive path offsets. However, the receive path in this instance includes the receive transmission element and the TRP receiver.

Figure 3:
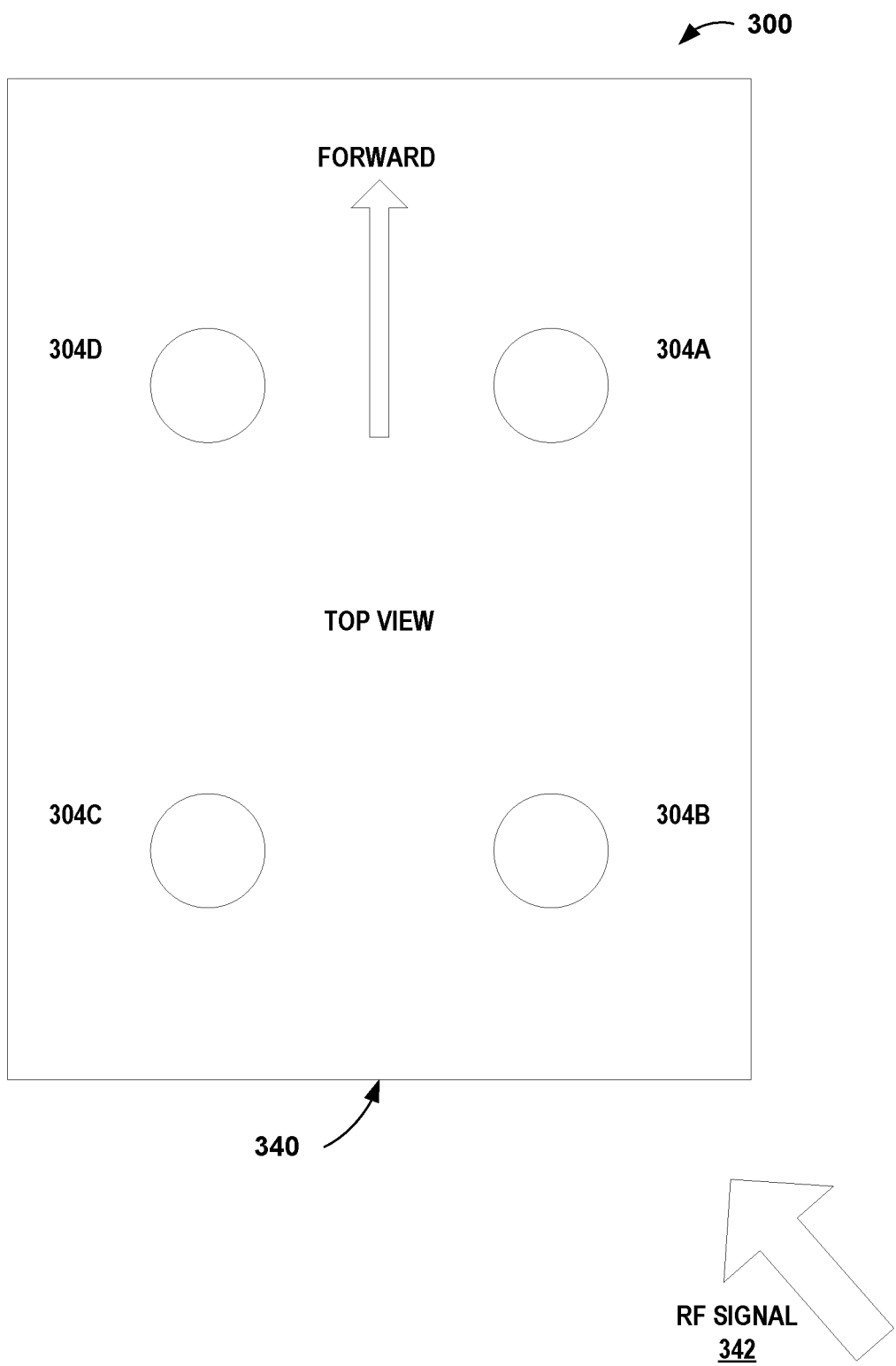
FIG. 3 is a conceptual diagram illustrating an example physical layout of a four-element antenna system according to one or more techniques of this disclosure.

FIG. 3 is a conceptual diagram illustrating an example physical layout of a four-element antenna according to one or more techniques of this disclosure. Antenna 300 may be one possible example of the multi-element antenna arrays 134 and 234 described above in relation to FIGS. 1 and 2.

Antenna 300 may include housing 340 that may provide structural support for antenna elements 304A-304D. Housing 340 may contain and provide protection for circuitry such as a beamforming network, calibration circuitry, connection ports and other components.

Antenna elements 304A-304D are arranged such that a received signal at antenna 300 may have a difference between the different antenna elements. For example, RF signal 342 may arrive at antenna element 304B before antenna element 304D receives RF signal 342. Therefore, there may be a phase difference between the signal conducted to a beamforming network of antenna 300 from antenna element 304B and antenna element 304D. Processing circuitry coupled to antenna 300 may use these differences to calculate one or more characteristics of RF signal 342, such as an AOA. Similarly, the arrangement of antenna elements 304A-304D may form spatial beams for signals transmitted from antenna 300 by varying the phase and amplitudes of signals sent by a transmission/receiving unit.

Figure 4:
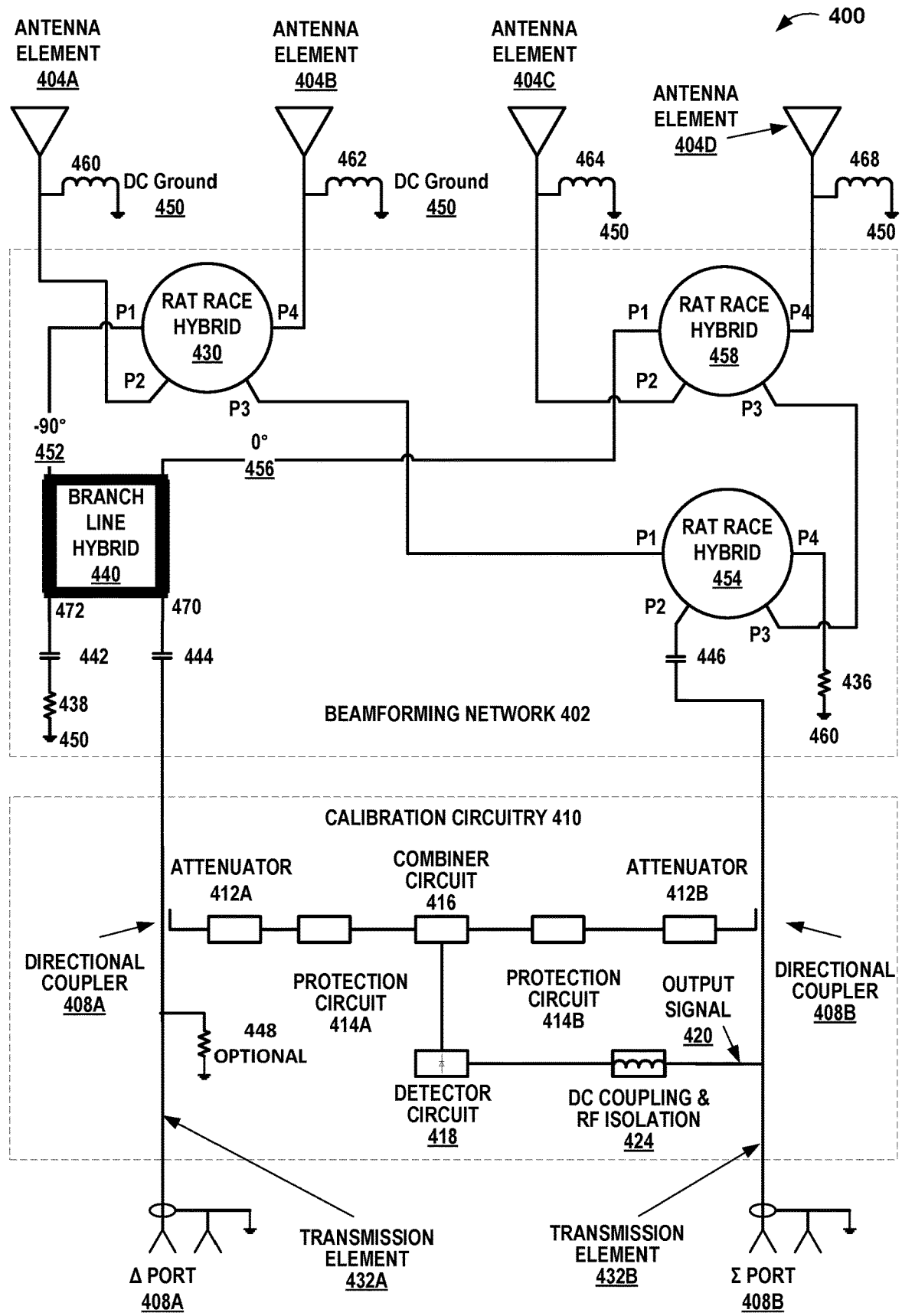
FIG. 4 is a schematic diagram illustrating circuitry for an example four-element antenna and beamforming network according to one or more techniques of this disclosure.

FIG. 4 is a schematic diagram illustrating an example four-element antenna and beamforming network according to one or more techniques of this disclosure. Antenna 400 is an example of multi-element antenna array 134 and multi-element antenna array 234 described above in relation to FIGS. 1 and 2.

The example of antenna 400 includes dual input ports 406A and 406B to conduct RF signals via transmission elements 432A and 432B. In some examples, port 408B may be considered a summing port, as indicated by Σ. Also, port 408A may be considered a difference port, as indicated by Δ.

Similar to calibration circuitry 210 described above in relation to FIG. 2, calibration circuitry 410 is configured to sample RF signals from transmission elements 432 and couple output signal 420 to transmission element 432B. Antenna 400 includes beamforming network 402 and four antenna elements 404A-404D. Antenna elements 404A, 404B, 404C and 404D may be any type of antenna element configured to transmit RF energy and receive RF energy.

As with calibration circuitry 210 described above in relation to FIG. 2, in the example of antenna 400, calibration circuitry 410 includes directional couplers 408A and 408B, attenuators 412A and 412B, protection circuits 414A and 414B, combiner circuit 416, detector circuit 418, and DC coupling and RF isolation circuit 424. Directional coupler 408A is electromagnetically coupled to transmission element 432A and outputs signals sampled from transmission element 432A to attenuator 412A. Attenuator 412A outputs signals to protection circuitry 414A, which is connected to one of the inputs for combiner circuit 416. Similarly, directional coupler 408B is electromagnetically coupled to transmission element 432B and outputs signals sampled from transmission element 432B to attenuator 412B. Attenuator 412B outputs signals to protection circuitry 414B, which is connected to a second input for combiner circuit 416. Combiner circuit 416 outputs the combined signals from transmission elements 432 to detector circuit 418. DC coupling and RF isolation circuit 424 receives the signal from detector circuit 418 and couples output signal 420 to transmission element 432B. As described above for output signal 220, output signal 420 may be connected to either or both of transmission elements 432 (not shown in FIG. 4).

The function and description of the components of calibration circuit 410 are the same as the similar components described above in relation to calibration circuit 210. For example, protection circuits 414A and 414B, along with attenuators 412A and 412B may be configured to protect one or more elements of calibration circuit 410 from damage caused by high signal levels during normal system operation mode. Combiner circuit 416 performs the same functions as combiner circuit 216, and so on. Similarly, the calibration procedure described above in relation to FIG. 2 applies equally to FIG. 4.

In the example of antenna 400, beamforming network 402 connects the two transmission elements 432 to the four antenna elements 404A-404D. Beamforming network 402 includes branch line hybrid 440 and rat race hybrids 430, 454 and 458. Other examples of beamforming networks may include other components and other configurations.

Transmission element 232B connects to P2 (port 2) of rat race hybrid 454 through capacitor 446. P4 of rat race hybrid 454 connects to DC ground 450 through resistor 436. P3 of rat race hybrid 454 connects to P3 of rat race hybrid 458. P4 of rat race hybrid 458 connects to antenna element 404D as well as to DC ground 450 through inductor 468. P2 of rat race hybrid 458 connects to antenna element 404C as well as to DC ground 450 through inductor 464.

P1 of rat race hybrid 454 connects to P3 of rat race hybrid 430. P4 of rat race hybrid 430 connects to antenna element 404B and to DC ground 450 through inductor 462. P2 of rat race hybrid 430 connects to antenna element 404A as well as to DC ground 450 through inductor 460.

P1 of rat race hybrid 430 connects to the −90° port 452 of branch line hybrid 440. P1 of rat race hybrid 458 connects to the 0° (zero) port 456 of branch line hybrid 440. Port 472 of branch line hybrid 440 connects to DC ground 450 through the series connection of capacitor 44 and resistor 438. Transmission element 432A connects to port 470 of branch line hybrid 440 through capacitor 444.

Figure 5:
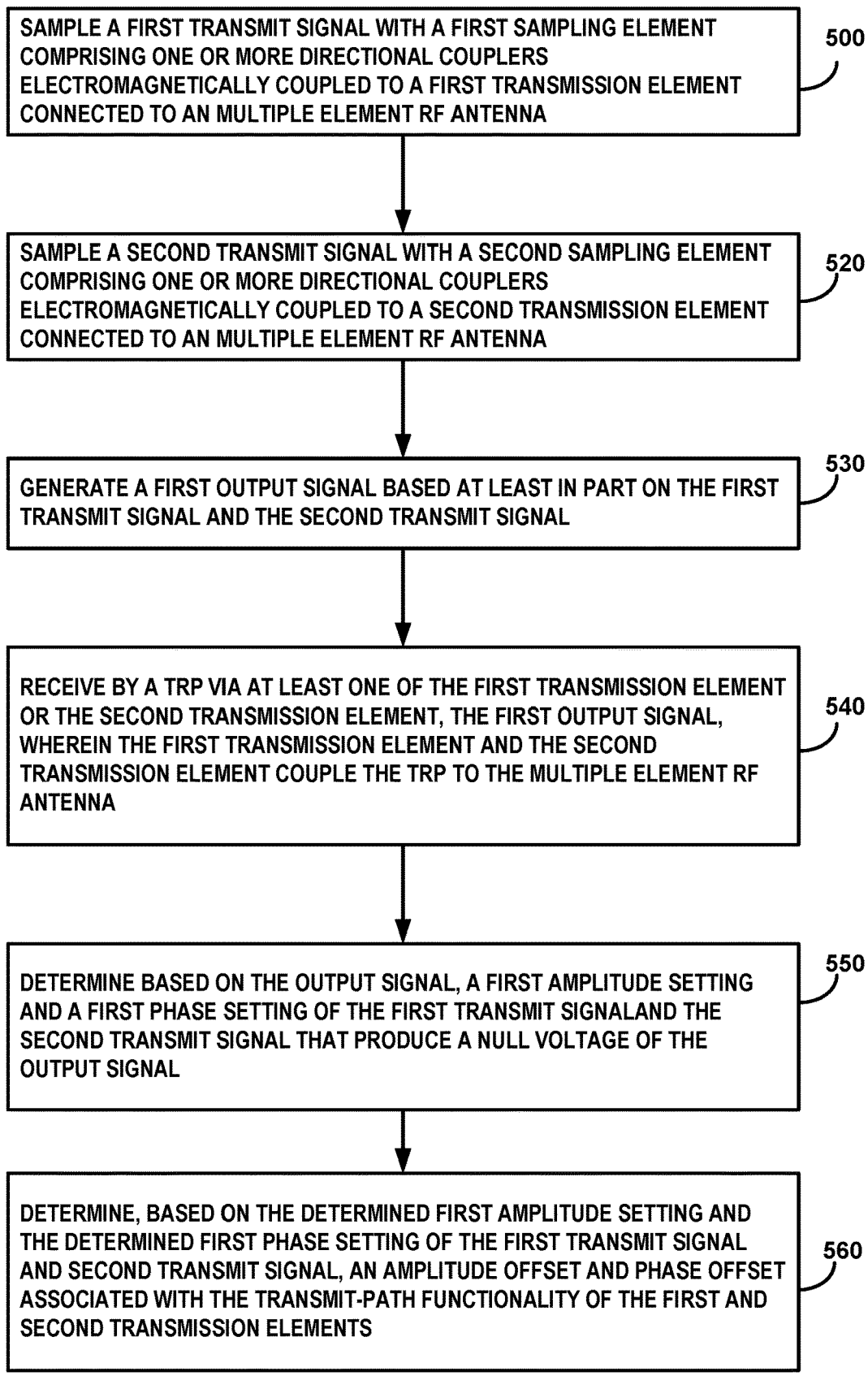
FIG. 5 is a flow chart illustrating an example operation of a calibration circuit according to one or more techniques of this disclosure.

FIG. 5 is a flow chart illustrating an example operation of a calibration circuit according to one or more techniques of this disclosure. The blocks of FIG. 5 will be described in terms of FIG. 2, unless otherwise noted. The blocks of FIG. 5 describe techniques to determine the transmission calibration constants associated with the transmit path functionality of system 200, including multi-element antenna array 234.

Sample a first transmit signal with a first sampling component, e.g. directional coupler 208A, electromagnetically coupled to a first transmission element, e.g. transmission element 232A, connected to a multiple element RF antenna, i.e. multi-element antenna array 234 (500). The transmit signal may come from a TRP, such as TRP 130 described above in relation to FIG. 1.

Sample a second transmit signal using a second sampling component, e.g. directional coupler 208B, electromagnetically coupled to a first transmission element, e.g. transmission element 232B connected to the same multi-element antenna array 234 (520). Transmission element 232A and transmission element 232B each have a respective transmit-path functionality as described above in relation to FIGS. 1 and 2. In some examples, process steps 500 and 520 occur concurrently.

Generate output signal 220 based at least in part on the first transmit signal and the second transmit signal (530). As described above in relation to FIG. 2, calibration circuit 220 combines the sampled transmit signals and outputs the result to detector circuit 218.

Processing circuitry, such as processing circuitry in a TRP may receive output signal 220 via at least one of transmission elements 232 (540). In the example of FIG. 2, output signal 220 is coupled to transmission element 232B.

The processing circuitry may determine a first amplitude setting and a first phase setting of the first transmitter output and the second transmitter output that produce a null voltage of the first output signal (550). For example, the TRP may vary the phase and/or amplitude of either the first transmit signal or the second transmit signal until the detected vector sum of the first transmit signal or the second transmit signal is minimized. The vector sum may be minimized when output signal 220 is in a null condition.

Processing circuitry may further determine the transmission calibration constants based on the determined first amplitude setting and the determined first phase setting of the first transmit signal and/or the second transmit signal (560). The calibration constants may be based on an amplitude offset and phase offset associated with the transmit-path functionality of the first transmission element and the second transmission element.

As described above in relation to FIGS. 1 and 2 (not shown in FIG. 5), the processing circuitry may apply the transmit calibration constants to measured received signals to determine the receive calibration constants. The TRP may send a transmit signal, e.g. the first transmit signal, to a first antenna port, such as via transmission element 232A. One or more antenna elements coupled to the first antenna port via the beamforming network may transmit the first transmit signal, which may be received by one or more other antenna elements coupled to a second antenna port via the beamforming network. A transmission element, e.g. transmission element 232B may carry the received signal from the second antenna port to receive processing circuitry, e.g. within a TRP. The receive processing circuitry may measure the phase and amplitude of the received signal. In other words, transmitter circuitry of a TRP may transmit a signal through the first transmission element, beamforming network and antenna elements that is received at the opposite TRP receive processing circuitry coupled to the second transmission element. In this manner the TRP may determine receive characteristics of the second receive path. The TRP may apply the transmit calibration constants to the received signal and determine one or more receive offsets (i.e. receive calibration constants) for the second receive path.

To determine the receive characteristics of the signal path that includes the first transmission element, transmit circuitry in the TRP may transmit the second transmit signal via the second transmission element, e.g. transmission element 232B and measure the amplitude and phase of the signal received via the opposite, i.e. first antenna port carried by the first transmission element, i.e. transmission element 232A. As with the second receive path, the transmitted signal travels from the TRP, via the second transmission element 232B, the beamforming network and transmitted by one or more antenna elements. The signal may be received by one or more other antenna elements and carried to receive processing circuitry of the TRP via the beamforming network and the first transmission element 232A. In other words, the system may transmit into the other antenna port and read the phase and amplitude of the first TRP receiver. As described above, the TRP may apply the transmit calibration constants to determine receive path phase and amplitude offsets. The set of calculated offsets for both receive paths comprise the set of receive calibration constants.

Various examples of the disclosure have been described. These and other examples are within the scope of the following claims.

The invention claimed is:

1. A multi-element array antenna system, comprising:
   a plurality of antenna elements configured to transmit and receive radio frequency (RF) signals for an aircraft RF signaling system;
   a beamforming network coupled to the plurality of antenna elements, the beamforming network comprising only two input ports, the two input ports being a first input port and a second input port;
   a first transmission element and a second transmission element, the first transmission element coupled to the beamforming network at the first input port and the second transmission element coupled to the beamforming network at the second input port, wherein the first transmission element and the second transmission element have respective transmit-path functionality and receive-path functionality;
   a calibration circuit comprising:
      a first sampling component electromagnetically coupled to the first transmission element and configured to sample a first transmit signal from the first transmission element;
      a second sampling component electromagnetically coupled to the second transmission element and configured to sample a second transmit signal from the second transmission element,
      wherein the calibration circuit is configured to generate an output signal based on only the first transmit signal and the second transmit signal,
      wherein the output signal comprises information used to determine an amplitude offset and phase offset associated with the transmit-path functionality of the first transmission element and second transmission element.

2. The system of claim 1, further comprising a transmitting, receiving, and processing (TRP) unit, wherein the TRP unit is configured to determine, based on the output signal, a first amplitude setting and a first phase setting of the first transmit signal and the second transmit signal that produce a null voltage of the output signal.

3. The system of claim 2, wherein the aircraft RF signaling system comprises a traffic collision avoidance system (TCAS).

4. The system of claim 1, further comprising a transmitting, receiving, and processing (TRP) unit, which includes a first receive processing circuitry and a second receive processing circuitry wherein:

the first receive processing circuitry is connected to the first transmission element and is configured to receive a first received signal, via at least one antenna element of the plurality of antenna elements and the beamforming network, comprising the second transmit signal from the TRP unit; and the second receive processing circuitry is connected to the second transmission element and is configured to receive a second received signal, via the at least one antenna element of the plurality of antenna elements and the beamforming network, comprising the first transmit signal from the same TRP unit.

5. The system of claim 4, wherein the second receive processing circuitry of the TRP is configured to measure the phase and amplitude of the first received signal and the first receive processing circuitry of the TRP is configured to measure the phase and amplitude of the second received signal.

6. The system of claim 5, wherein the TRP is configured to determine receive calibration constants based on applying the amplitude offset and the phase offset to the measured phase and amplitude of the first received signal and applying the amplitude offset and the phase offset to the measured phase and amplitude of the second received signal.

7. The system of claim 1, wherein the calibration circuit further comprises:
   a combining element configured to combine the sampled first and second transmit signals into a composite radio frequency (RF) signal; and
   a detector element configured to convert the composite RF signal into a DC signal, wherein the output signal comprises the DC signal.

8. The system of claim 7, wherein the calibration circuit further comprises a DC coupling and RF isolation element configured to couple the DC signal to one of the first transmission element or the second transmission element.

9. The system of claim 1, wherein the system is configured to operate in calibration mode and in normal system operation mode.

10. The system of claim 9, wherein the calibration circuit further comprises one or more attenuator component and one or more protection circuits configured to protect one or more elements of the calibration circuit from damage caused by high signal levels during normal system operation mode.

11. The system of claim 1, wherein the calibration circuit provides self-calibration for the aircraft RF signaling system.

12. A calibration circuit, the circuit comprising:
   a first sampling component and a second sampling component;
   a combining element:
      coupled to the first sampling component and the second sampling component; and
      configured to combine a first signal from the first sampling component and a second signal from the second sampling component into a composite radio frequency (RF) signal; and
   a detector element coupled to the combining element and configured to convert the composite RF signal into a DC output signal,
   wherein:
      the first sampling component is configured to sample a first transmit signal to a first input port of a RF antenna configured to transmit and receive RF signals for an aircraft RF signaling system, the RF antenna comprising multiple antenna elements and only two input ports, the two input ports being the first input port and a second input port;

the second sampling component is configured to sample a second transmit signal to the second input port of the RF antenna;

the DC output signal is based at least in part on the first transmit signal and the second transmit signal, and the DC output signal comprises information used to determine an amplitude offset and phase offset associated with a transmit-path functionality of the first input element and second input element.

13. The circuit of claim 12, wherein the information used to determine an amplitude offset and phase offset is determined when the first transmit signal and the second transmit signal produce a null voltage in the output signal.

14. The circuit of claim 13, wherein the first transmit signal is 180 degrees out of phase with the second transmit signal.

15. The circuit of claim 12, further comprising one or more attenuator components and one or more protection circuits configured to protect one or more components of the circuit from damage caused by high signal levels during normal system operation mode.

16. A method comprising:

sampling a first transmit signal with a first sampling component comprising one or more directional couplers electromagnetically coupled to a first transmission element connected to a radio frequency (RF) antenna comprising multiple antenna elements and configured to transmit and receive RF signals for an aircraft RF signaling system, wherein the RF antenna comprises only two input ports;

sampling a second transmit signal with a second sampling component comprising one or more directional couplers electromagnetically coupled to a second transmission element connected to the same RF antenna, a second transmit signal, wherein the first transmission element and the second transmission elements each have a respective transmit-path functionality, and wherein the first transmission element connects to a first input port of the two input ports and the second transmission element connects to a second input port of the two input ports;

generating an output signal based at least in part on the first transmit signal and the second transmit signal;

receiving, by a transmit, receiving, and processing circuitry (TRP) and via at least one of the first transmission element or the second transmission element, the output signal, wherein the first transmission element and the second transmission element couple the TRP to the multiple element RF antenna;

determining, by the TRP and based on the output signal, a first amplitude setting and a first phase setting of the first transmit signal and the second transmit signal that produce a null voltage of the output signal; and determining, based on the determined first amplitude setting and the determined first phase setting of the first transmit signal and second transmit signal, an amplitude offset, and phase offset associated with the transmit-path functionality of the first and second transmission elements.

17. The method of claim 16, wherein the first transmission element and the second transmission element couple the TRP to the multiple antenna elements of the RF antenna via a beamforming network coupled to the multiple element RF antenna.

18. The method of claim 16, wherein:

generating the first transmit signal and the second transmit signal comprises generating the first transmit signal and the second transmit signal by the TRP;

wherein generating the output signal comprises:

generating a composite RF signal based at least in part on a first sampled signal from the first sampling component and a second sampled signal from the second sampling component; and generating a DC signal based at least in part on the composite RF signal, wherein the output signal comprises the DC signal.

19. The method of claim 16, wherein determining a first amplitude setting and a first phase setting of the first transmit signal and the second transmit signal that produce a null voltage of the output signal comprises determining that the first transmit signal is 180 degrees out of phase with the second transmit signal.

20. The method of claim 16, wherein the first transmission element and the second transmission element are coupled to the RF antenna via a beamforming network, the method further comprising determining, by the TRP, receive calibration constants associated with a receive-path functionality of the first and second transmission elements based on:

measuring, by the TRP, a phase and amplitude of the first transmit signal received, via at least one antenna element of the multiple antenna elements and the beamforming network, by the second transmission element;

measuring, by the TRP, a phase and amplitude of the second transmit signal received, via at least one antenna element of the multiple element RF antenna and the beamforming network, by the first transmission element; and applying the amplitude offset and phase offset associated with the transmit-path functionality to the:

phase and amplitude of the first transmit signal received by the second transmission element; and phase and amplitude of the second transmit signal received by the first transmission element.

* * * * *